(12) United States Patent
Chang et al.

(10) Patent No.: US 6,451,476 B1
(45) Date of Patent: Sep. 17, 2002

(54) CASE INCLUDING PERIPHERAL SEALING PORTIONS FOR ENCLOSING A SECONDARY BATTERY

(75) Inventors: Youn-han Chang, Kyungki-do; Jong-hoon Yun, Kwangyuk, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/542,472

(22) Filed: Apr. 4, 2000

(30) Foreign Application Priority Data

Apr. 16, 1999 (KR) .............................. 99-6249
Nov. 17, 1999 (KR) ............................. 99-51062

(51) Int. Cl.[7] ................................ H01M 2/02
(52) U.S. Cl. ....................... 429/127; 429/163
(58) Field of Search ................. 429/127, 163, 429/178, 96–100; 206/405, 404; 426/392

(56) References Cited

U.S. PATENT DOCUMENTS

| | | | |
|---|---|---|---|
| 4,623,599 A | * | 11/1986 | Vourlis |
| 4,664,994 A | * | 5/1987 | Koike et al. |
| 5,017,442 A | * | 5/1991 | Watanabe et al. |
| 5,339,973 A | * | 8/1994 | Edwards et al. .......... 220/4.21 |
| 5,725,967 A | * | 3/1998 | Tuttle |
| 6,048,639 A | * | 4/2000 | Sonozaki et al. |
| 6,106,973 A | * | 8/2000 | Sonozaki et al. |

FOREIGN PATENT DOCUMENTS

| | | | |
|---|---|---|---|
| JP | 61-29065 A | * | 2/1986 |
| JP | 11-260327 A | * | 9/1999 |

* cited by examiner

Primary Examiner—Patrick Ryan
Assistant Examiner—Susy Tsang-Foster
(74) Attorney, Agent, or Firm—Leydig, Voit & Mayer, Ltd.

(57) ABSTRACT

A case for a secondary battery. The case for a secondary battery has a space in which an assembled battery unit including a positive electrode plate, a separator, and a negative electrode plate, is accommodated, and sealing portions welded along the periphery of the space, wherein at least one notch is present in the sealing portions.

4 Claims, 4 Drawing Sheets

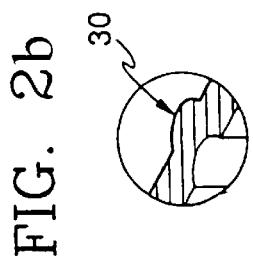
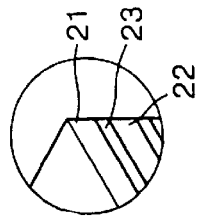
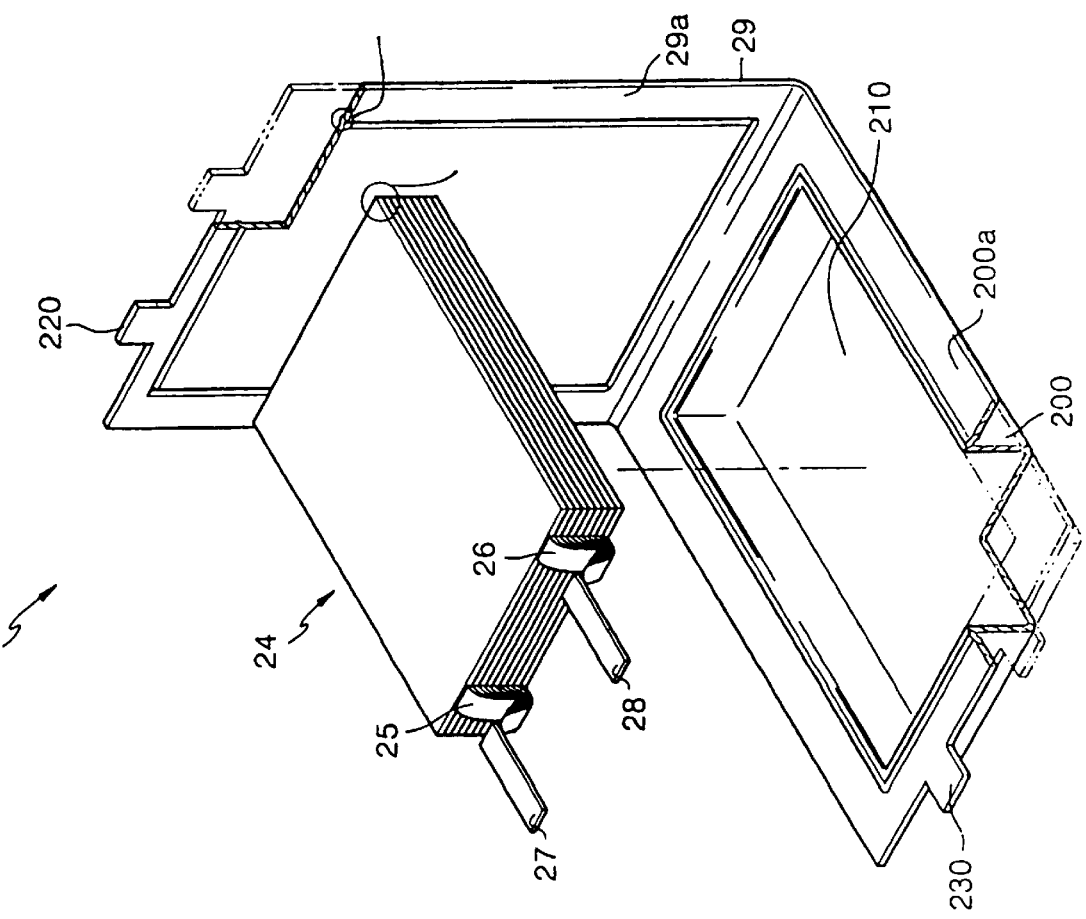

CASE INCLUDING PERIPHERAL SEALING PORTIONS FOR ENCLOSING A SECONDARY BATTERY

BACKGROUND OF THE INVENTION

1. Field of the Invention

The present invention relates to a secondary battery, and more particularly, to a case of a secondary battery which has an improved structure at a portion where sealing portions are folded in the case for enveloping an assembled battery unit.

2. Description of the Related Art

In general, secondary batteries capable of charging and discharging are applied to the fields of advanced, apparatus such as cellular phones, notebook-type computers, computer camcorders and the like. In particular, research into the lithium secondary batteries is being vigorously conducted since they have a service life 3 times longer than nickel-cadmium (Ni—Cd) batteries or nickel metal hydride (Ni—MH) batteries which are in widespread use as the power source of electronic equipment and have excellent characteristics with respect to the energy density per unit weight.

Such lithium secondary batteries are classified into liquid electrolyte batteries and polymer electrolyte batteries according to the type of electrolyte used. Generally, batteries using liquid electrolyte are called lithium ion batteries and batteries using polymer electrolyte are called a lithium polymer batteries.

Lithium secondary batteries are fabricated in various shapes. Typically, cylindrical or prismatic batteries are fabricated to be mainly used as lithium-ion batteries. Lithium polymer secondary batteries have flexibility so that they are relatively free in view of shape design. In recent years, lithium polymer secondary batteries having excellent safety and freedom in shape design and being light-weight have been advantageously used in view of attainment of miniaturized and light-weight portable electronic apparatuses.

As shown in FIG. 1, a conventional lithium polymer secondary battery 10 includes an assembled battery unit 11 having a plurality of assembled batteries each having a positive electrode plate, a negative electrode plate and a separator interposed therebetween laminated therein, a plurality of positive electrode tabs 12 drawn out from one side periphery of the positive electrode plate and a plurality of negative electrode tabs 13 drawn out from one side periphery of the negative electrode plate, the plurality of positive and negative electrode tabs 12 and 13 forming positive and negative electrode tab groups, respectively, and positive and negative electrode terminals 14 and 15 electrically connected to the positive and negative electrode tab groups, respectively.

Also, the conventional lithium polymer secondary battery 10 includes a case 17 having a space 16 in which the assembled battery unit 11 is accommodated. The case 17 includes upper and lower case bodies which are integrally formed along one peripheral side with the other peripheral series capable of being separated.

A sealing portion 17a is provided in each of the upper and lower case bodies along the periphery of the space 16 for hermetically sealing the inside of the battery 10 when the upper and lower case bodies are welded to each other.

Here, in order to minimize the volume in packaging the battery 10, the sealing portion 17a is folded toward the sidewall of the case 17 after mounting the assembled battery unit 10 in the space 16 and then sealing the same. Then, the, sealing portion 17a is fixed to the sidewall of the case 17 when folded, using separately provided adhering means.

According to the conventional lithium secondary battery 10, an embossing treatment is employed for improving airtightness. However, the embossing treatment makes it difficult to fold the sealing portion 17a while improving airtightness. Also, it is not easy to install a protection circuit module which is separately provided for the battery 10. Further, since the positive and negative electrode terminals 14 and 15 partially protrude outside the case 17, they are susceptible to deformation at protruding parts from one side of the case 17.

SUMMARY OF THE INVENTION

To solve the above problems, it is an object of the present invention to provide a case of a secondary battery having an improved structure in which the sealing portion in the periphery of a case can be easily folded.

It is another object of the present invention to provide a case of a secondary battery having an improved structure in which the deformation of positive and negative electrode terminals can be prevented.

Accordingly, to achieve the above object, there is provided a case of a secondary battery, the case having a space in which an assembled battery unit consisting of a positive electrode plate, a separator and a negative electrode plate, is accommodated, and sealing portions welded along the periphery of the space, wherein at least one notch portion is formed in the sealing portions.

Also, the notch portion preferably has a predetermined curvature so as to be closely fixed and folded toward the side wall of the case.

Further, the notch portion is preferably formed along the periphery of the space.

Also, the notch portion may include a first notch formed in the vicinity of the space along the periphery thereof, and a second notch spaced a predetermined distance apart from the first notch for preventing the sealing portions from partly protruding outside the case due to the longer width of the sealing portion than the depth of the case.

Here, the portion where the notch portion is formed is preferably sealed by a surface-contact method and the sealing portions excluding the notch portion are preferably embossed to maintain airtightness.

BRIEF DESCRIPTION OF THE DRAWINGS

The above object and advantages of the present invention will become more apparent by describing in detail a preferred embodiment thereof with reference to the attached drawings in which:

FIG. 2A is a partly cut-away exploded view schematically illustrating a secondary battery according to a first embodiment of the present invention; and FIG. 2B and 2C are detail views.

DESCRIPTION OF THE PREFERRED EMBODIMENT

Figure 1:
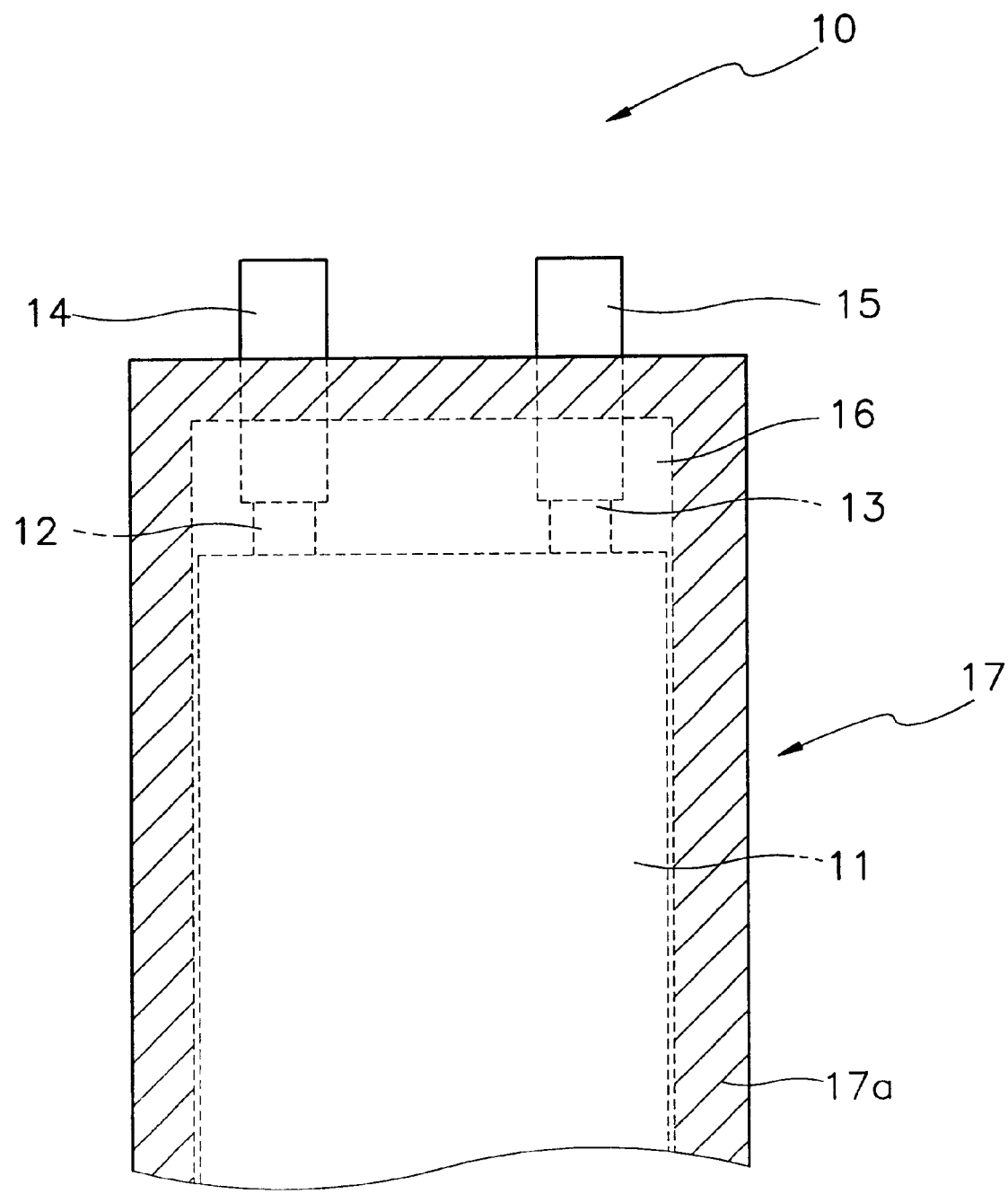
FIG. 1 is a schematic plan view illustrating a conventional lithium polymer secondary battery.

A case of a secondary battery according to a preferred embodiment of the present invention will now be described in detail with reference to the accompanying drawings.

FIG. 2A illustrates a case of a secondary battery 20 according to an embodiment of the present invention.

Referring to FIG. 2A and 2B, the secondary battery 20 includes an assembled battery unit 24 having a plurality of assembled batteries laminated sequentially, each of the assembled batteries having a positive electrode plate 21, a negative electrode plate 22 and a separator interposed therebetween. A plurality of positive electrode tabs 25 and a plurality of negative electrode tabs 26 are drawn out along one peripheral sides of each of the positive and negative electrode plates 21 and 22 and welded, respectively. A positive electrode terminal 27 and a negative electrode terminal 28 are welded to the plurality of positive and negative electrode tabs 25 and 26, respectively. The plurality of positive and negative electrode tabs 25 and 26 are folded in a V shape for maximizing the energy density per unit area in a space 210 of a lower case body 200 to be described later.

Also, a case in which the assembled battery unit 24 is mounted is separately provided in the battery 20. The case has an upper case body 29 and the lower case body 200 integral with the upper case body 29 along one peripheral side thereof, the other side of the upper and lower case bodies capable of being separated from edit others. The space 210 for accommodating the assembled battery unit 24 is formed in the lower case body 200.

Also, an upper sealing portion 29a and a lower sealing portion 200a are formed in the upper and lower case bodies 29 and 200 along the periphery of the space 210 to be sealed to each other for hermetically enclosing the battery 20.

Here, the upper and lower sealing portions 29a and 200a are sealed by an embossing treatment for maintaining the airtightness of the battery 20. In other words, the embossing treatment is applied to the contact surface produced when the upper and lower case bodies 29 and 200 are mutually welded. Here, a notch 30, shown in FIG. 2A and 2B and 2C which is a feature of the present invention, is formed in a predetermined portion where the sealing portions 29a and 200a are located.

In order to prevent the positive and negative electrode terminals 27 and 28 from being deformed where parts of the positive and negative electrode terminals 27 and 28 are drawn outside the case, an upper terminal reinforcement portion 220 and a lower terminal reinforcement portion 230 are located at the corresponding locations of the upper and lower sealing portions 29a and 200a. The upper and lower terminal reinforcement portions 220 and 230 have a predetermined width and protrude from the upper and lower sealing portions 29a and 200a, respectively. Preferably, a coating of a sealant is applied over the upper and lower sealing portions 29a and 200a in order to prevent moisture from permeating from the outside during a subsequent fabrication process.

Figure 3:
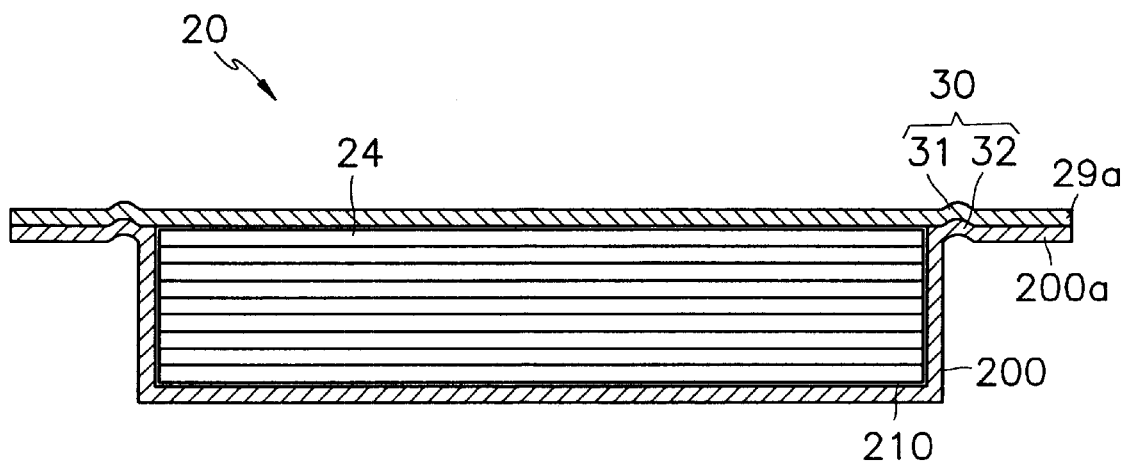
FIG. 3 is a cross-sectional view illustrating the state before sealing portions of the secondary battery shown in FIG. 2A is folded.
Figure 4:
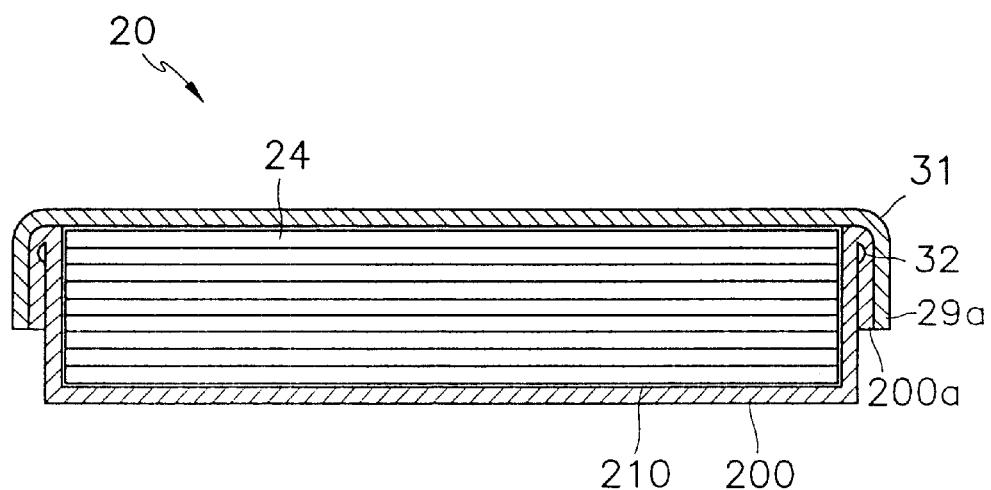
FIG. 4 is a cross-sectional view illustrating the state after sealing portions of the secondary battery shown in FIG. 2A are folded.

FIG. 3 illustrates the state before sealing portions of the secondary battery shown in FIG. 2A are folded, and FIG. 4 illustrates the state after sealing portions of the secondary battery shown in FIG. 2 are folded. Here, the same reference numerals as those shown above denote the same elements.

Referring to FIGS. 3 and 4, the battery 20 includes an assembled battery unit 24 having a plurality of assembled batteries laminated sequentially, each of the assembled batteries having a positive electrode plate, a separator and a negative electrode plate in sequence, accommodated in a space 210 provided in a lower case body 200. An upper sealing portion 29a and a lower sealing portion 200a which are sealed by an embossing treatment, are formed along the periphery of a space 210 in which the assembled battery unit 24 is mounted. A notch 30 is formed in the sealing portions 29a and 200a in the vicinity of the space 210.

In more detail, an upper notch 31 and a lower notch 32 which are warped at the same position along the periphery in the vicinity of the space 210 with predetermined curvatures, are formed on the surface where the upper sealing portion 29a and the lower sealing portion 200a are welded to each other. The upper and lower notches 31 and 32 are not embossed t facilitate folding of the upper and lower sealing portions 29a and 200a along the side walls of the lower case body 200 as shown in FIG. 4. The surface where the upper and lower sealing portions 29a and 200a, which integrally extend from the upper and lower notches 31 and 32, are sealed, is subjected to an embossing treatment, thereby improving the hermetic sealing of the battery 20. The upper and lower sealing portions 29a and 200a preferably have various patterns on sealed surfaces to increase friction for preventing slippage when they are sealed to each other.

The secondary battery 20 according to the present invention is packaged as follows. First, the assembled battery unit 24 is mounted in the space 210. Then, the surface where the upper and lower case bodies 29 and 200 are welded, is sealed by heat fusion. Subsequently, in order to reduce the volume of the battery 20, the sealing portions 29a and 200a are folded. Here, since the upper and lower notches 31 and 32 have predetermined curvatures, they can be easily folded along the side wall of the lower case body 200.

The upper and lower sealing portions 29a and 200a which have undergone the embossing treatment are not folded but face the side wall of the lower case body 200. The upper and lower sealing portions 29a and 200a will be later adhered to the side wall of the lower case body 200 by separate adhesion means, for example, a tape.

Figure 5:
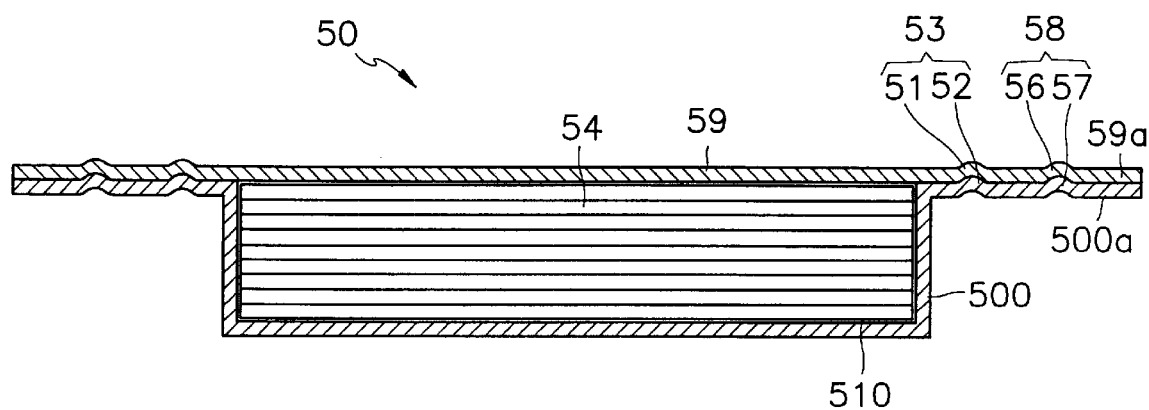
FIG. 5 is a cross-sectional view illustrating the state before sealing portions of a secondary battery according to a second embodiment of the present invention.
Figure 6:
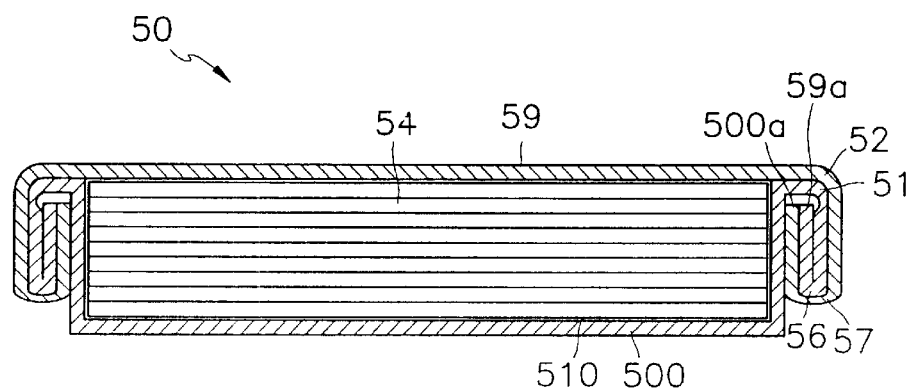
FIG. 6 is a cross-sectional view illustrating the state after sealing portions of the secondary battery shown in FIG. 5 is folded.

FIG. 5 illustrates the state before the sealing portion of a secondary battery 50 according to a second embodiment of the present invention, and FIG. 6 illustrates the state after sealing portions of the secondary battery shown in FIG. 5 are folded.

Referring to FIGS. 5 and 6, the secondary battery 50 includes an assembled battery unit 54 having a plurality of assembled batteries each having a positive electrode plate, a separator and a negative electrode plate in arranged sequence. The assembled battery unit 54 is mounted inside upper and lower case bodies 59 and 500 which can be separated from each other. A space 510 in which the assembled battery unit 54 is accommodated is provided in the lower case body 500.

An upper sealing portion 59a and a lower sealing portion 500a which are hermetically sealed along the periphery of the space 510 are part of the upper and lower case bodies 59 and 500. The upper and lower sealing portions 59a and 500a are sealed by an embossing treatment for maintaining the airtightness of the battery 50.

Here, in order to ensure the airtightness of the inside of the battery 50, the upper and lower sealing portions 59a and 500a may be such that the width of the sealed upper and lower sealing portions is longer than the depth of the lower case body 500. Here, when the upper and lower sealing portions 59a and 500a are folded to the side wall of the lower case body 500, they partially protrude toward the lower portion of the lower case body 500. To prevent this, a plurality of notches 53 and 58 are formed in the upper and lower sealing portions 59*a* and 500*a*.

In other words, a first upper notch 51 and a first lower notch 52 each having a predetermined curvature are formed in the vicinity of the periphery of the space 510 on the surface where the upper sealing portion 59*a* and the lower sealing portion 500*a* are welded to each other.

Second notches are formed in the sealing portions 59*a* and 500*a* so as to prevent the sealing portions 59*a* and 500*a* from being folded beyond the bottom surface of the lower case body 500. A second upper notch 56 and a second lower notch 57 are located in the upper and lower sealing portions 59*a* and 500*a* corresponding to locations spaced a predetermined distance apart from the first upper and lower notches 51 and 52. The first upper and lower notches 51 and 52 and the second upper and lower notches 56 and 57 are not embossed.

Accordingly, the assembled battery unit 54 is mounted in the space 510 provided in the lower case body 500, and the upper and lower sealing portions 59*a* and 500*a* are hermetically sealed and are then sealed along the side wall of the lower case body 500 so that the first notch 53 and the second notch 58 are transformed by leaving folded.

Here, if the width of the sealing portion 59*a* or 500*a* is longer then the depth of the lower case body 500, a plurality of notches which can be easily folded may be formed, as described above.

In other words, the second upper and lower notches 56 and 57 are first folded 30 and then the first upper and lower notches 51 and 52 are next folded. Then, the notches are positioned toward the side wall of the lower case body 500.

Accordingly, the upper and lower sealing portions 59*a* and 500*a* which have undergone the embossing treatment can be positioned in the side of the lower case body 500 without being folded and will then be fixed to the side wall of the lower case body 500 using separate adhesion means such as a tape.

As described above, according to the case of the secondary battery of the present invention, notches having predetermined curvatures are formed in sealing portions of the case. Accordingly, when sealing portions are folded to be closely fixed to the outer surface of the case, since the notches are folded and the other portions which have undergone an embossing treatment are positioned along the side wall of the case without being folded, the notches can be easily transformed, thereby improving the volume reducing effect of the battery. Also, reinforcement portions which are installed at sealing portions from which positive and negative electrode terminals protrude can minimize the deformation of the positive and negative electrode terminals.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A case for a secondary battery, the case comprising:
a first case body having a recess defined by side walls for receiving a secondary battery and a peripheral sealing portion extending outwardly from the side walls defining the recess, the peripheral sealing portion including a continuous first notch having, in cross-section, a curvature; and surrounding and proximate the recess;
a second case body hingedly connected to one side of the first case body, including a peripheral sealing portion for sealing to the sealing portion of the first case body, and a continuous first notch having, in cross-section, a curvature, and a shape, and positioned for engaging the first notch of the first case body when the peripheral portions of the first and second case bodies are in contact with each other; and
a second notch, having a curvature in cross-section, in the sealing portions of each of the first and second case bodies, spaced outwardly from the first notches in the sealing portions of the first and second case bodies, and shaped and positioned for engagement when the first notches of the first and second case bodies are engaged.

2. The case according to claim 1, wherein the first and second notches are positioned, relative to the side walls, for folding of the peripheral sealing portions, first along the second notches and second along the first notches, so that the folded peripheral sealing portions are positioned adjacent the side walls of the recess, with the peripheral sealing portions of the first and second case bodies in contact.

3. A case for a secondary battery, the case comprising:
a first case body having a recess defined by side walls for receiving a secondary battery and a peripheral sealing portion extending outwardly from the side walls defining the recess, the peripheral sealing portion including a continuous first notch having, in cross-section, a curvature, and surrounding and proximate the recess;
a second case body hingedly connected to one side of the first case body, including a peripheral sealing portion for sealing to the sealing portion of the first case body, and a continuous first notch having, in cross-section, a curvature, and a shape, and positioned for engaging the first notch of the first case body when the peripheral portions of the first and second case bodies are in contact with each other; and
a pattern on the peripheral sealing portions of the first and second case bodies for preventing slippage of the peripheral sealing portions of the first and second case bodies when the peripheral sealing portions of the first and second case bodies are in contact with each other.

4. A case for a secondary battery, the case comprising:
a first case body having a recess defined by side walls for receiving a secondary battery and a peripheral sealing portion extending outwardly from the side walls defining the recess, the peripheral sealing portion including a continuous first notch having, in cross-section, a curvature, and surrounding and proximate the recess;
a second case body hingedly connected to one side of the first case body, including a peripheral sealing portion for sealing to the sealing portion of the first case body, and a continuous first notch having, in cross-section, a curvature, and a shape, and positioned for engaging the first notch of the first case body when the peripheral portions of the first and second case bodies are in contact with each other, wherein the first and second case bodies include protruding positive and negative terminal reinforcement portions extending from the peripheral sealing portions of the first and second case bodies for reinforcing the case; and,
a sealant coating the positive and negative electrode reinforcement portions.

* * * * *